(12) United States Patent
Senior et al.

(10) Patent No.: US 9,818,409 B2
(45) Date of Patent: *Nov. 14, 2017

(54) CONTEXT-DEPENDENT MODELING OF PHONEMES

(71) Applicant: Google Inc., Mountain View, CA (US)

(72) Inventors: Andrew W. Senior, New York, NY (US); Hasim Sak, New York, NY (US); Izhak Shafran, Portland, OR (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/877,673

(22) Filed: Oct. 7, 2015

(65) Prior Publication Data

US 2016/0372118 A1    Dec. 22, 2016

Related U.S. Application Data

(60) Provisional application No. 62/182,385, filed on Jun. 19, 2015.

(51) Int. Cl.
*G10L 15/00* (2013.01)
*G10L 17/00* (2013.01)
(Continued)

(52) U.S. Cl.
CPC .............. *G10L 17/14* (2013.01); *G10L 15/02* (2013.01); *G10L 15/16* (2013.01); *G10L 2015/025* (2013.01)

(58) Field of Classification Search
CPC ......... G10L 15/01; G10L 15/02; G10L 15/08; G10L 15/14; G10L 15/16; G10L 15/063;
(Continued)

(56) References Cited

U.S. PATENT DOCUMENTS 5,481,644 A * 1/1996 Inazumi .................. G10L 15/16
  704/232
5,749,066 A * 5/1998 Nussbaum ............ G10L 15/063
  704/232

(Continued)

OTHER PUBLICATIONS

P. Schwarz, P. Matejka and J. Cernocky, "Hierarchical Structures of Neural Networks for Phoneme Recognition," 2006 IEEE International Conference on Acoustics Speech and Signal Processing Proceedings, Toulouse, 2006, pp. I-I.*

(Continued)

*Primary Examiner* — Edgar Guerra-Erazo
(74) *Attorney, Agent, or Firm* — Fish & Richardson P.C.

(57) ABSTRACT

Methods, systems, and apparatus, including computer programs encoded on computer storage media for modeling phonemes. One method includes receiving an acoustic sequence, the acoustic sequence representing an utterance, and the acoustic sequence comprising a respective acoustic feature representation at each of a plurality of time steps; for each of the plurality of time steps: processing the acoustic feature representation through each of one or more recurrent neural network layers to generate a recurrent output; processing the recurrent output using a softmax output layer to generate a set of scores, the set of scores comprising a respective score for each of a plurality of context dependent vocabulary phonemes, the score for each context dependent vocabulary phoneme representing a likelihood that the context dependent vocabulary phoneme represents the utterance at the time step; and determining, from the scores for the plurality of time steps, a context dependent phoneme representation of the sequence.

17 Claims, 5 Drawing Sheets

(51) Int. Cl.
  *G10L 15/14* (2006.01)
  *G10L 13/00* (2006.01)
  *G10L 17/14* (2013.01)
  *G10L 15/02* (2006.01)
  *G10L 15/16* (2006.01)

(58) Field of Classification Search
  CPC ... G10L 15/065; G10L 15/083; G10L 15/142; G10L 15/144; G10L 15/148; G10L 2015/025; G10L 17/04; G10L 17/06; G10L 17/14; G10L 17/16
  See application file for complete search history.

(56) References Cited

U.S. PATENT DOCUMENTS

| | | | | |
|---|---|---|---|---|
| 5,809,462 | A * | 9/1998 | Nussbaum | G10L 15/063 704/232 |
| 5,864,803 | A * | 1/1999 | Nussbaum | G10L 15/063 704/231 |
| 5,867,816 | A * | 2/1999 | Nussbaum | G10L 15/063 704/231 |
| 8,126,710 | B2 * | 2/2012 | Gemello | G10L 15/16 704/202 |
| 2012/0065976 | A1 * | 3/2012 | Deng | G10L 15/14 704/256.1 |
| 2014/0257805 | A1 * | 9/2014 | Huang | G10L 15/063 704/232 |

OTHER PUBLICATIONS

F. Eyben, M. Wollmer, B. Schuller and A. Graves, "From speech to letters—using a novel neural network architecture for grapheme based ASR," 2009 IEEE Workshop on Automatic Speech Recognition & Understanding, Merano, 2009, pp. 376-380.*

Graves et al., "Connectionist Temporal Classification: Labelling Unsegmented Sequence Data with Recurrent Neural Networks," In Proceedings of the 23rd International Conference on Machine Learning, pp. 369-376, ACM, 2006).

Sak et al., "Long Short-Term Memory Based Recurrent Neural Network Architectures for Large Vocabulary Speech Recognition," Feb. 5, 2014, [online] (retrieved from http://arxiv.org/abs/1402.1128), 5 pages.

Graves et al., "Speech recognition with deep recurrent neural networks," in IEEE International Conference on Acoustics, Speech, and Signal Processing (ICASSP), 2013, 5 pages.

Sak et al., "Learning acoustic frame labeling for speech recognition with recurrent neural networks," in IEEE International Conference on Acoustics, Speech, and Signal Processing (ICASSP), 2015, pp. 4280-4284.

Senior et al., "Context dependent phone models for LSTM RNN acoustic modelling," in IEEE International Conference on Acoustics, Speech, and Signal Processing (ICASSP), 2015, 5 pages.

Young et al., "Tree-based state tying for high accuracy acoustic modelling," in Proc. ARPA Human Language Technology Workshop, 1994, pp. 307-312.

* cited by examiner

CONTEXT-DEPENDENT MODELING OF PHONEMES

CROSS-REFERENCE TO RELATED APPLICATION

This application claims priority to U.S. Provisional Application No. 62/182,385 filed on Jun. 19, 2015. The disclosure of the prior application is considered part of and is incorporated by reference in the disclosure of this application.

BACKGROUND

This specification relates to generating phoneme representations of acoustic sequences.

Acoustic modeling systems receive an acoustic sequence and generate a phoneme representation of the acoustic sequence. The acoustic sequence for a given utterance includes a sequence of multiple frames of acoustic data at each of a set of time steps. The phoneme representation is a sequence of phonemes or phoneme subdivisions that the acoustic modeling system has classified as representing the received acoustic sequence. An acoustic modeling system can be used in, for example, a speech recognition system, e.g., in conjunction with a pronunciation modeling system and a language modeling system.

SUMMARY

In general, one innovative aspect of the subject matter described in this specification can be embodied in methods that include the actions of receiving an acoustic sequence, the acoustic sequence representing an utterance, and the acoustic sequence comprising a respective acoustic feature representation at each of a plurality of time steps; for each of the plurality of time steps: processing the acoustic feature representation for the time step through each of one or more recurrent neural network layers to generate a recurrent output for the time step; processing the recurrent output for the time step using a softmax output layer to generate a set of scores for the time step, the set of scores for the time step comprising a respective score for each of a plurality of context dependent vocabulary phonemes, the score for each context dependent vocabulary phoneme representing a likelihood that the context dependent vocabulary phoneme represents the utterance at the time step; and determining, from the scores for the plurality of time steps, a context dependent phoneme representation of the sequence.

Other embodiments of this aspect include corresponding computer systems, apparatus, and computer programs recorded on one or more computer storage devices, each configured to perform the actions of the methods. A system of one or more computers can be configured to perform particular operations or actions by virtue of software, firmware, hardware, or any combination thereof installed on the system that in operation may cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations the set of scores for the time step further comprises a respective score for a blank character phoneme, the score for the blank character phoneme representing a likelihood that the utterance at the time step is incomplete.

In some implementations the softmax output layer is a Connectionist Temporal Classification (CTC) output layer.

In other implementations the recurrent neural network layers and the CTC output layer are trained to using a set of input training data.

In some cases the method includes generating the context dependent vocabulary phonemes, wherein generating the context dependent vocabulary phonemes comprises: generating a set of vocabulary phoneme classes using the training data; dividing each vocabulary phoneme class into one or more subclasses using phonetic questions; and clustering similar contexts using a state-tying algorithm to generate a set of context dependent vocabulary phonemes.

In some implementations the cardinality of the set of context dependent vocabulary phonemes is higher than the cardinality of the set of vocabulary phoneme classes.

In other implementations the phonetic questions are maximum-likelihood-gain phonetic questions.

In some cases the recurrent neural network layers are Long Short-Term Memory (LSTM) neural network layers.

The subject matter described in this specification can be implemented in particular embodiments so as to realize one or more of the following advantages. By incorporating context dependent vocabulary phonemes, an acoustic modeling system implementing context dependent modeling of phonemes can achieve improved performance and greater accuracy compared to other acoustic modeling systems, such as conventional sequence trained LSTM-hybrid models. In addition, the acoustic modeling system implementing context dependent modeling of phonemes may generate phoneme representations of audio data that are more meaningful and have higher levels of accuracy than phoneme representations generated by other acoustic modeling systems.

An acoustic modeling system implementing context dependent modeling of phonemes builds an inventory of phonemes for use in generating context dependent phoneme representations of audio data without requiring the alignment and segmentation of audio data and phonemes. Therefore, an acoustic modeling system implementing context dependent modeling of phonemes improves the efficiency of a phoneme modeling process compared to other acoustic models.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
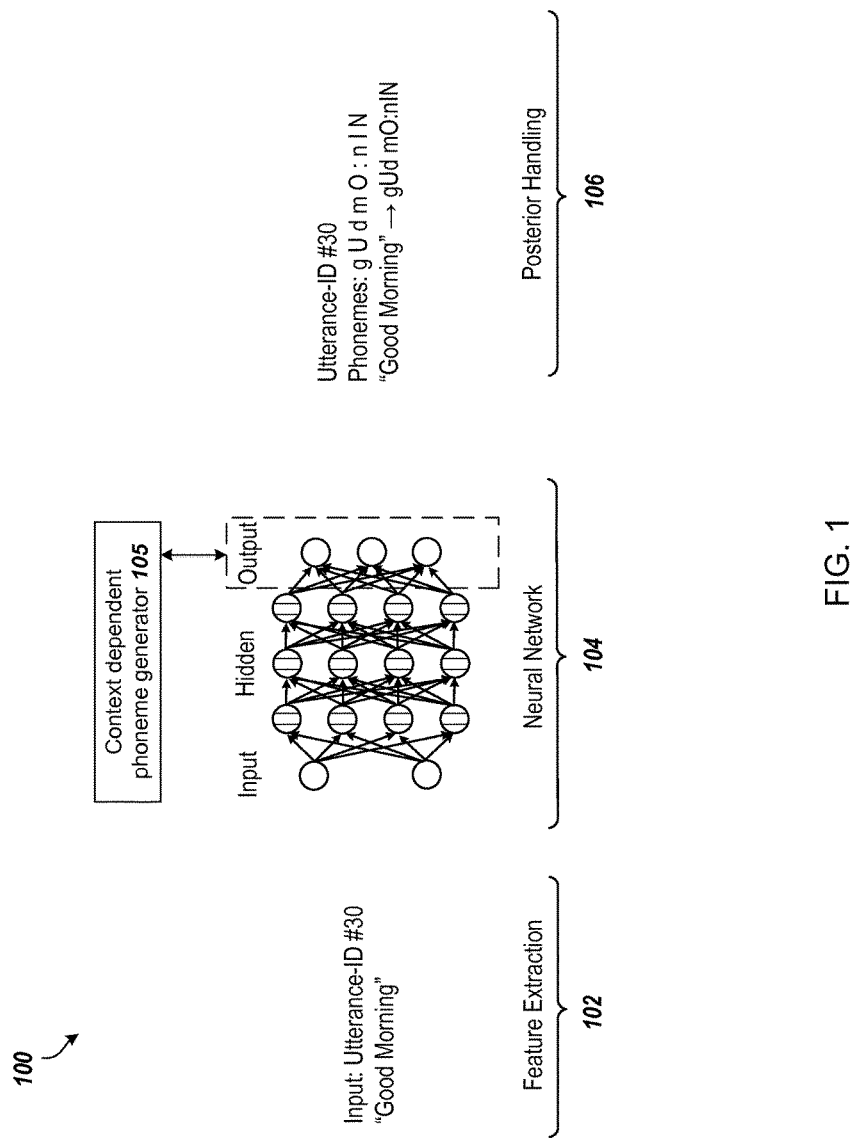
FIG. 1 is an example of an acoustic modeling system.

FIG. 1 shows an example of an acoustic modeling system 100. The acoustic modeling system 100 includes a feature extraction module 102, a neural network 104, a context dependent phoneme generator 105, and a posterior handling module 106. The acoustic modeling system 100 is an example of a system implemented as computer programs on one or more computers in one or more locations, in which the systems, components, and techniques described below, can be implemented.

The feature extraction module 102 receives an acoustic sequence and generates a feature representation for frames of audio data in the acoustic sequence, e.g., from an audio waveform. For example, the acoustic modeling system 100 may receive a digital representation of an utterance, e.g., as a continuous stream of data, and split the stream into a sequence of multiple frames of data corresponding to a set of time steps, e.g., where each frame is associated with 10 milliseconds of audio stream data. The feature extraction module 102 may analyze each of the frames to determine feature values for the frames and generate corresponding acoustic feature representations. For example, the feature extraction module 102 may determine feature values for the frames and place the features' values in feature representation vectors which can be stacked, e.g., using left and right context of adjacent feature vectors, to create a larger feature representation vector that characterizes the utterance at the corresponding time step.

The neural network 104 receives a feature representation for each of a set of time steps. The neural network 104 is trained to process the feature representations and generate a set of phoneme scores for each of the time steps. The set of phoneme scores for each of the time steps may include context dependent phoneme scores. For example, the context dependent phoneme generator 105 may generate a set of context dependent phonemes and configure the output layer of the neural network 104 to generate a set of context dependent phoneme scores for the context dependent phonemes.

The posterior handling module 106 processes the phoneme scores and generates a phoneme representation of the sequence of acoustic feature representations.

For example, as shown in FIG. 1, the acoustic modeling system 100 may receive a digital representation of speech for a window of time where the digital representation of speech includes data representing the utterance "Good Morning." The acoustic modeling system 100 may divide the window into a number of frames. The feature extraction module 102 determines feature representations for each of the frames, e.g., determines feature vectors for each of the frames, and provides the feature representations for each of the frames to the neural network 104.

The neural network 104 analyzes the feature representations and, for each of the feature representations, generates a set of phoneme scores. The neural network 104 provides the set of phoneme scores for each of the frames to the posterior handling module 106.

The posterior handling module 106 combines the phoneme scores for the frames to generate a phoneme representation of the utterance "Good Morning." For example, as shown in FIG. 1, the posterior handling module may generate the phoneme representation "gUd mO:nIN".

Figure 2:
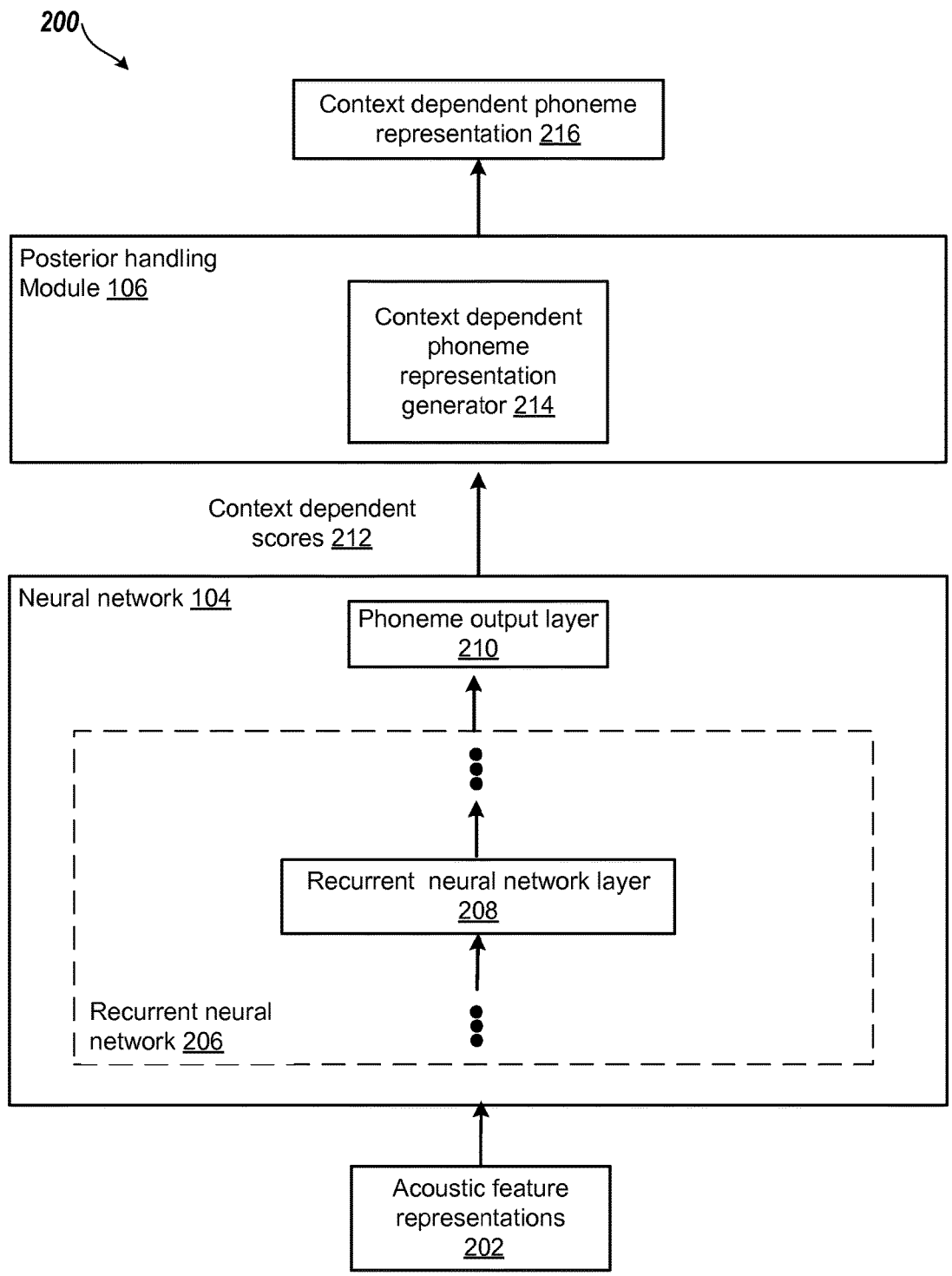
FIG. 2 is a block diagram of an example system for context dependent modeling of phonemes.

FIG. 2 is a block diagram of the example acoustic modeling system 100 described above with reference to FIG. 1. As described above, the acoustic modeling system 100 includes the neural network 104 and the posterior handling module 106.

The acoustic modeling system 100 receives a set of acoustic feature representations that characterizes an utterance, e.g., as generated by the feature extraction module 102 of FIG. 1, and generates corresponding context dependent phoneme representations for the acoustic feature representations. For example, the system 100 can receive acoustic feature representations 202 from the feature extraction module 102 of FIG. 1, generate context dependent phoneme scores 212, and generate context dependent phoneme representations 216.

The neural network 104 includes a recurrent neural network 206 which, in turn, includes one or more recurrent neural network layers, e.g., recurrent neural network layer 208. Although only a single recurrent neural network layer 208 is shown in FIG. 2 for clarity, in some implementations the neural network 104 includes multiple recurrent neural network layers arranged in a sequence from a lowest recurrent layer to a highest recurrent layer. At each time step, each recurrent neural network layer receives an input from the preceding recurrent neural network layer, or, if the recurrent neural network layer is the lowest layer in the sequence of recurrent neural network layers, from the feature extraction module 102 as described with reference to FIG. 1, and generates a layer output for the time step.

The recurrent neural network layers can include one or more Long Short-Term Memory (LSTM) neural network layers. A LSTM neural network layer is a neural network layer that has one or more LSTM memory blocks. An example LSTM neural network that can be used to process acoustic features is described in more detail in "Long Short-Term Memory Based Recurrent Neural Network Architectures for Large Vocabulary Speech Recognition," Haim Sak, Andrew Senior, Francoise Beaufays, http://arxiv.org/abs/1402.1128.

At each time step, the recurrent neural network 206 processes the feature representation for the time step using the recurrent neural network layers to generate a recurrent output for the time step.

The neural network 104 further includes a phoneme output layer 210. At each time step, the phoneme output layer 210 receives the recurrent output for the time step generated by the recurrent neural network 206 and generates a respective layer output for the time step from the recurrent output. The phoneme output layer 210 can be a connectionist temporal classification (CTC) layer.

For example, the phoneme output layer 210 may be a softmax classifier layer that processes the recurrent output for a given time step to generate a set of phoneme scores. Each phoneme score corresponds to a respective phoneme from a set of phonemes. The set of phonemes includes a set of vocabulary phonemes and a blank phoneme. The set of vocabulary phonemes are a set of phonemes that may be possible phoneme representations of utterances, and do not include the blank phoneme. The score for a given vocabulary phoneme represents a likelihood that the corresponding phoneme represents the received acoustic feature representation. The score for the blank phoneme represents a likelihood that none of the phonemes in the vocabulary accurately represent the acoustic feature representation or that the acoustic feature representation at the time step is incomplete. An example CTC layer is described in more detail in "Connectionist Temporal Classification: Labelling Unsegmented Sequence Data with Recurrent Neural Networks," Alex Graves, Santiago Fernandez, Faustino Gomez, and Juergen Schmidhuber, *Proceedings of the 23$^{rd}$ International Conference on Machine Learning*, 2006.

In particular, the set of vocabulary phonemes may be context dependent vocabulary phonemes. A context dependent vocabulary phoneme is a subdivision of a vocabulary phoneme that is dependent on the context in which the vocabulary phoneme occurs. For example, the English language includes at least 41 vocabulary phonemes, such as /a/. However, an /a/sounds different when it is preceded by a /k/ and followed by a /t/, as in the word "cat", as opposed to when it is preceded by a /b/ and followed by a /t/, as in the word "bat". Therefore, two examples of context dependent phonemes include, say, $a_1$ and $a_2$, where $a_1$ represents the vocabulary phoneme /a/ that is preceded by a /k/ and followed by a /t/, and $a_2$ represents the vocabulary phoneme /a/ that is preceded by a /b/ and followed by a /t/. The total number of context dependent vocabulary phonemes in the English language can easily reach several thousands.

The posterior handling module 106 processes the context dependent phoneme scores 212 and generates context dependent phoneme representations 216 of the acoustic feature representations. For example, the posterior handling module 106 may select the phoneme from the set of phonemes having the highest score at each time step and output a sequence of the selected phonemes as the phoneme representation for the acoustic feature representations.

Figure 3:
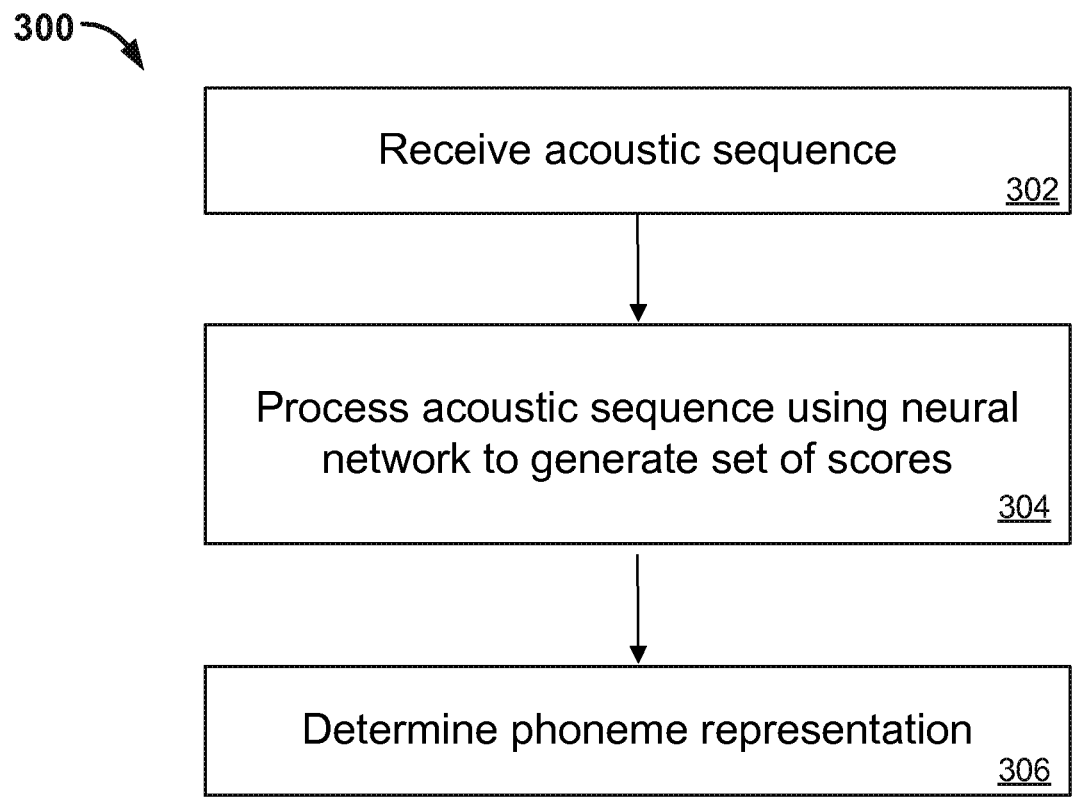
FIG. 3 is a flow diagram of an example process for processing an acoustic sequence.

FIG. 3 is a flow diagram of an example process 300 for processing an acoustic sequence. For convenience, the process 300 will be described as being performed by a system of one or more computers located in one or more locations. For example, an acoustic modeling system, e.g., the acoustic modeling system 100 of FIG. 1, appropriately programmed, can perform the process 300.

The system receives an acoustic sequence (step 302). The acoustic sequence represents an utterance and may include a respective frame of data for each of a set of time steps. Each frame of data is an acoustic feature representation of the utterance at the corresponding time step.

The system processes the acoustic sequence using an acoustic modeling neural network to generate a set of context dependent scores for each of the set of time steps (step 304). For example, the system may process the acoustic sequence using an acoustic modeling neural network, e.g., the neural network 104 of FIG. 1, to generate a set of phoneme scores for each time step. The set scores for each time step includes a respective score for each of a set of context dependent vocabulary phonemes and a respective score for a blank character phoneme. The score for each context dependent vocabulary phoneme represents a likelihood that the context dependent vocabulary phoneme represents the utterance at the time step. The score for the blank character phoneme represents a likelihood that none of the phonemes in the set of context dependent vocabulary phonemes accurately represent the utterance at the time step, or that the acoustic feature representation at the time step is incomplete. Generating a set of context dependent scores for an acoustic feature representation at a corresponding time step will be described in more detail below with reference to FIG. 4.

The system determines a context dependent phoneme representation of the acoustic sequence using the generated set of context dependent scores for each of the set of time steps (step 306).

Figure 4:
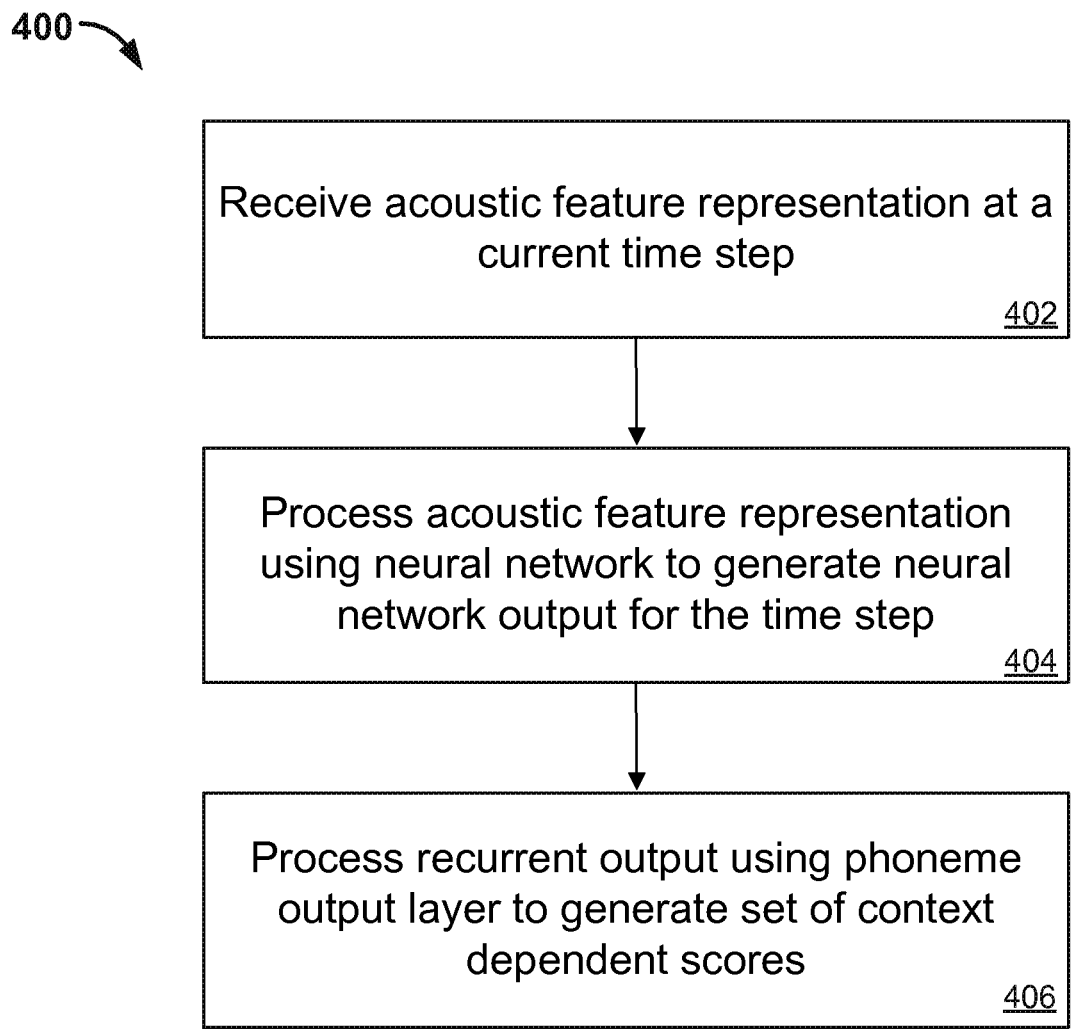
FIG. 4 is a flow diagram of an example process for generating a set of context dependent scores.

FIG. 4 is a flow diagram of an example process 400 for generating a context dependent set of scores. For convenience, the process 400 will be described as being performed by a system of one or more computers located in one or more locations. For example, an acoustic modeling system, e.g., the acoustic modeling system 100 of FIG. 1, appropriately programmed, can perform the process 400.

The system receives an acoustic feature representation at a current time step (step 402). The acoustic feature representation is one of a set of acoustic feature representations at a set of corresponding time steps that together form an acoustic sequence that represents an utterance.

The system processes the acoustic feature representation at the current time step using a recurrent neural network, e.g., recurrent neural network 206 of FIG. 2, to generate a corresponding recurrent neural network output (step 404).

The system processes the recurrent neural network output using a phoneme output layer, e.g., phoneme output layer 210 of FIG. 2, to generate a set of context dependent scores for the acoustic feature representation (step 406). The set of context dependent scores for the acoustic feature representation may be used to generate a context dependent phoneme representation of the acoustic feature representation.

The processes 300 and 400 can be performed to generate sets of context dependent scores for determining context dependent phoneme representations for each time step of an acoustic sequence input for which the desired output is not known, i.e., for a received acoustic sequence for which the desired context dependent phoneme representation is not known. However the processes 300 and 400 can also be performed for each time step of a training sequence, i.e., an acoustic sequence for which the desired context dependent phoneme representation is already known, as part of a training process to determine trained values of a set of parameters of the system. For example, the training process may be a conventional LSTM training process, e.g., a backpropagation through time training process. During the training, the system backpropagates gradients computed for each of the layers of the neural network. In particular, the system backpropagates gradients from the phoneme output layer to the highest recurrent neural network layer in order to update the parameters of the highest recurrent neural network layer.

The training sequence may also be used to generate the context dependent vocabulary phonemes that, in turn, may be used to configure the CTC output layer of the neural network to model context dependent phonemes prior to a training process that determines trained values of a set of parameters of the system. Generating a set of context dependent phonemes using a set of input training data and training a neural network with a CTC output layer for modeling context dependent phonemes is described below with reference to FIG. 5.

Figure 5:
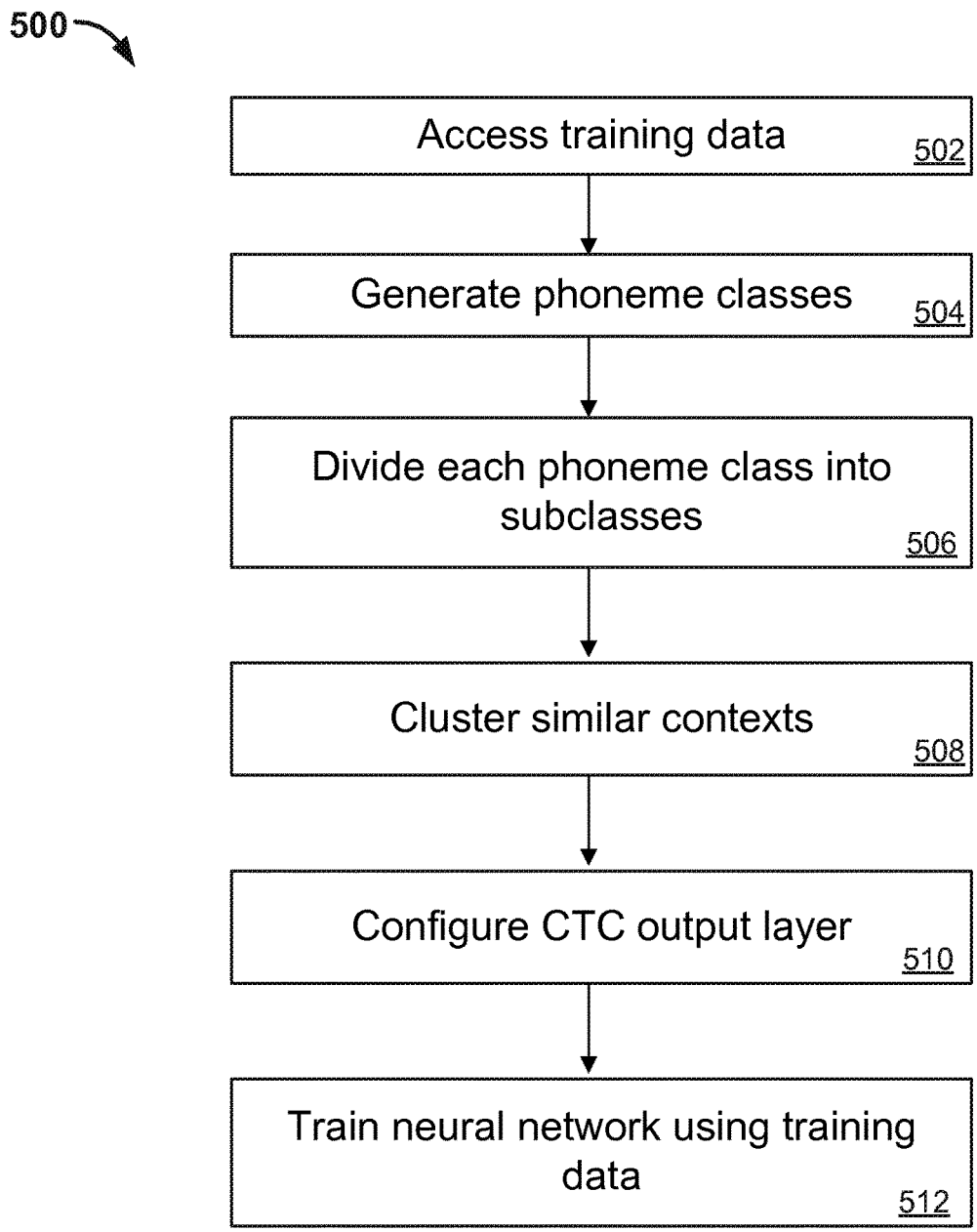
FIG. 5 is a flow diagram of an example process for generating context dependent vocabulary phonemes and training a neural network with a CTC output later for modeling context dependent phonemes.

FIG. 5 is a flow diagram of an example process 500 for generating context dependent vocabulary phonemes and training a neural network with a CTC output layer for modeling context dependent phonemes. For convenience, the process 500 will be described as being performed by a system of one or more computers located in one or more locations. For example, a LSTM-RNN neural network system with a CTC output layer, e.g., the neural network system 104 of FIG. 1, appropriately programmed, can perform the process 500.

The system accesses a set of input training data (step 502). The input training data may include one or more audio logs of transcribed audio data.

The system extracts a set of vocabulary phoneme classes from the input training data (step 504). Each of the vocabulary phoneme classes in the set of vocabulary phoneme classes may correspond to a vocabulary phoneme. A vocabulary phoneme is a phoneme that may represent an utterance at a given time step. For example, input training data in the English language may have around 41 vocabulary classes, and the system may generate one class of vocabulary phonemes including all instances of the phoneme /a/ occurring in the input training data.

The system divides each vocabulary phoneme class into one or more subclasses using phonetic questions (step 506). The system may construct one decision tree per vocabulary phoneme class, and use phonetic questions to split the data at each node of the decision tree. In some implementations, the phonetic questions may be maximum-likelihood-gain phonetic questions. For example, the system may divide the class of vocabulary phonemes including all instances of the phoneme /a/ into subclasses such as a class representing all instances of the phoneme /a/ that is preceded by the phoneme /k/, or a class representing all instances of the phoneme /a/ that precedes the phoneme /t/, using corresponding phonetic questions such as "does this /a/ follow a /k/?" or "is this /a/ before a /t/?" Other examples of phonetic questions may include questions relating to what word the phoneme of interest occurs in, or whether the phoneme of interest is at the beginning or the end of a word. The combinatorics of these contexts can be very large. For example, if there are 41 vocabulary classes, then there can be 41^3 possible triphones, i.e., phonemes with contexts that consider only the immediate left and right context. Since some of these triphones may not occur in a language, or will not occur in a given data set, the number of triphones may be on the order of ~30000.

The system clusters similar contexts using a state-tying algorithm to generate context dependent vocabulary phonemes (step 508). For example, the system may implement a hierarchical binary divisive clustering algorithm for context tying. The resulting number of context dependent phonemes may be significantly larger than the original number of vocabulary phonemes, e.g., thousands of context dependent phonemes. Continuing the example above, a distinct set of clustered triphones may be on the order of ~10000.

The system configures the CTC output layer of the neural network to generate a respective score for each of the generated context dependent vocabulary phonemes and the blank character phoneme for each time step in an acoustic sequence that may be received by the neural network for processing (step 510).

The system trains the neural network to determine trained values of a set of parameters of the neural network (step 512). The trained values of a set of parameters of the neural network include a set of parameters of the configured CTC output layer. In some implementations, the system may train the neural network using the training data described above in step 502. In other implementations, the system may train the neural network using a second, different set of training data. The training process may be a conventional LSTM training process, e.g., a backpropagation through time training process. During the training, the system backpropagates gradients computed for each of the layers of the neural network. In particular, the system backpropagates gradients from the CTC output layer to the highest recurrent neural network layer in order to update the parameters of the highest recurrent neural network layer.

The system may provide the trained neural network for the modeling of phonemes in context.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   generating, by an automated speech recognition system that includes an acoustic modeling system and a language modeling system, a plurality of context dependent vocabulary phonemes, comprising:
   generating a set of vocabulary phoneme classes using training data,
   dividing each vocabulary phoneme class into one or more subclasses using phonetic questions, and
   clustering similar contexts using a state-tying algorithm to generate the plurality of context dependent vocabulary phonemes;
   receiving, by the acoustic modeling system of the automated speech recognition system, an acoustic sequence, the acoustic sequence representing an utterance, and the acoustic sequence comprising a respective acoustic feature representation at each of a plurality of time steps;
   for each of the plurality of time steps:
   processing, by the acoustic modeling system of the automated speech recognition system, the acoustic feature representation for the time step through each of one or more recurrent neural network layers to generate a recurrent output for the time step;
   processing, by the acoustic modeling system of the automated speech recognition system, the recurrent output for the time step using a softmax output layer to generate a set of scores for the time step, the set of scores for the time step comprising a respective score for each of the plurality of context dependent vocabulary phonemes, the score for each context dependent vocabulary phoneme representing a likelihood that the context dependent vocabulary phoneme represents the utterance at the time step;

determining, by the acoustic modeling system of the automated speech recognition system and from the scores for the plurality of time steps, a context dependent phoneme representation of the acoustic sequence; and processing the context dependent phoneme representation of the acoustic sequence that was determined by the acoustic modeling system of the automated speech recognition system, using the language modeling system of the automated speech recognition system, to generate a speech recognition result for the acoustic sequence.

2. The method of claim 1, wherein the set of scores for the time step further comprises a respective score for a blank character phoneme, the score for the blank character phoneme representing a likelihood that the utterance at the time step is incomplete.

3. The method of claim 1, wherein the softmax output layer is a Connectionist Temporal Classification (CTC) output layer.

4. The method of claim 1, wherein the recurrent neural network layers and the CTC output layer are trained using the training data.

5. The method of claim 1, wherein the cardinality of the set of context dependent vocabulary phonemes is higher than the cardinality of the set of vocabulary phoneme classes.

6. The method of claim 1, wherein the phonetic questions are maximum-likelihood-gain phonetic questions.

7. The method of claim 1, wherein the recurrent neural network layers are Long Short-Term Memory (LSTM) neural network layers.

8. A system comprising one or more computers and one or more storage devices storing instructions that are operable, when executed by the one or more computers, to cause the one or more computers to perform operations comprising:

generating, by an automated speech recognition system that includes an acoustic modeling system and a language modeling system, a plurality of context dependent vocabulary phonemes, comprising:
  generating a set of vocabulary phoneme classes using training data,
  dividing each vocabulary phoneme class into one or more subclasses using phonetic questions, and
  clustering similar contexts using a state-tying algorithm to generate the plurality of context dependent vocabulary phonemes;

receiving, by the acoustic modeling system of the automated speech recognition system, an acoustic sequence, the acoustic sequence representing an utterance, and the acoustic sequence comprising a respective acoustic feature representation at each of a plurality of time steps;

for each of the plurality of time steps:
  processing, by the acoustic modeling system of the automated speech recognition system, the acoustic feature representation for the time step through each of one or more recurrent neural network layers to generate a recurrent output for the time step;
  processing, by the acoustic modeling system of the automated speech recognition system, the recurrent output for the time step using a softmax output layer to generate a set of scores for the time step, the set of scores for the time step comprising a respective score for each of the plurality of context dependent vocabulary phonemes, the score for each context dependent vocabulary phoneme representing a likelihood that the context dependent vocabulary phoneme represents the utterance at the time step;

determining, by the acoustic modeling system of the automated speech recognition system and from the scores for the plurality of time steps, a context dependent phoneme representation of the acoustic sequence; and processing the context dependent phoneme representation of the acoustic sequence that was determined by the acoustic modeling system of the automated speech recognition system, using the language modeling system of the automated speech recognition system, to generate a speech recognition result for the acoustic sequence.

9. The system of claim 8, wherein the set of scores for the time step further comprises a respective score for a blank character phoneme, the score for the blank character phoneme representing a likelihood that the utterance at the time step is incomplete.

10. The system of claim 8, wherein the softmax output layer is a Connectionist Temporal Classification (CTC) output layer.

11. The system of claim 8, wherein the recurrent neural network layers and the CTC output layer are trained using the training data.

12. The system of claim 8, wherein the cardinality of the set of context dependent vocabulary phonemes is higher than the cardinality of the set of vocabulary phoneme classes.

13. The system of claim 8, wherein the phonetic questions are maximum-likelihood-gain phonetic questions.

14. The system of claim 8, wherein the recurrent neural network layers are Long Short-Term Memory (LSTM) neural network layers.

15. A non-transitory computer-readable storage medium comprising instructions stored thereon that are executable by a processing device and upon such execution cause the processing device to perform operations comprising:

generating, by an automated speech recognition system that includes an acoustic modeling system and a language modeling system, a plurality of context dependent vocabulary phonemes, comprising:
  generating a set of vocabulary phoneme classes using training data,
  dividing each vocabulary phoneme class into one or more subclasses using phonetic questions, and
  clustering similar contexts using a state-tying algorithm to generate the plurality of context dependent vocabulary phonemes;

receiving, by the acoustic modeling system of the automated speech recognition system, an acoustic sequence, the acoustic sequence representing an utterance, and the acoustic sequence comprising a respective acoustic feature representation at each of a plurality of time steps;

for each of the plurality of time steps:
  processing, by the acoustic modeling system of the automated speech recognition system, the acoustic feature representation for the time step through each of one or more recurrent neural network layers to generate a recurrent output for the time step;

processing, by the acoustic modeling system of the automated speech recognition system, the recurrent output for the time step using a softmax output layer to generate a set of scores for the time step, the set of scores for the time step comprising a respective score for each of the plurality of context dependent vocabulary phonemes, the score for each context dependent vocabulary phoneme representing a likelihood that the context dependent vocabulary phoneme represents the utterance at the time step;

determining, by the acoustic modeling system of the automated speech recognition system and from the scores for the plurality of time steps, a context dependent phoneme representation of the acoustic sequence; and processing the context dependent phoneme representation of the acoustic sequence that was determined by the acoustic modeling system of the automated speech recognition system, using the language modeling system of the automated speech recognition system, to generate a speech recognition result for the acoustic sequence.

16. The computer-readable storage medium of claim 15, wherein the set of scores for the time step further comprises a respective score for a blank character phoneme, the score for the blank character phoneme representing a likelihood that the utterance at the time step is incomplete.

17. The computer-readable storage medium of claim 15, wherein the softmax output layer is a Connectionist Temporal Classification (CTC) output layer.

* * * * *